(12) United States Patent
Uhl

(10) Patent No.: US 11,366,312 B2
(45) Date of Patent: Jun. 21, 2022

(54) MICROSCOPE DEVICE WITH ENHANCED CONTRAST FORMED BY LIGHT ILLUMINATION TRANSMITTED IN TWO DIFFERENT SPECTRAL RANGES

(71) Applicant: Miltenyi Biotec B.V. & CO. KG, Bergisch Gladbach (DE)

(72) Inventor: Rainer Uhl, Munich (DE)

(73) Assignee: Miltenyi Biotech B.V. & Co. KG, Bergisch Gladbach (DE)

(*) Notice: Subject to any disclaimer, the term of this patent is extended or adjusted under 35 U.S.C. 154(b) by 0 days.

(21) Appl. No.: 17/267,856

(22) PCT Filed: Aug. 12, 2019

(86) PCT No.: PCT/EP2019/071581
§ 371 (c)(1),
(2) Date: Feb. 11, 2021

(87) PCT Pub. No.: WO2020/038752
PCT Pub. Date: Feb. 27, 2020

(65) Prior Publication Data
US 2021/0173203 A1 Jun. 10, 2021

(30) Foreign Application Priority Data
Aug. 20, 2018 (EP) .................................. 18189765

(51) Int. Cl.
*G02B 27/00* (2006.01)
*G02B 21/02* (2006.01)
(Continued)

(52) U.S. Cl.
CPC ......... *G02B 27/0018* (2013.01); *G02B 21/02* (2013.01); *G02B 21/06* (2013.01);
(Continued)

(58) Field of Classification Search
CPC .... G02B 27/0018; G02B 21/02; G02B 21/06; G02B 21/16; G02B 21/361; G02B 27/141; G02B 21/14; H04N 5/225
(Continued)

(56) References Cited

U.S. PATENT DOCUMENTS 11,053,540 B1* 7/2021 Chen ...................... G06V 20/69
2009/0103801 A1* 4/2009 Messier .................... G06T 7/90
382/163
(Continued)

FOREIGN PATENT DOCUMENTS

KR     20170000647 U * 1/2017 ............. G02B 21/06
WO    WO-0006980 A1 * 2/2000 ............ G01J 3/2823

OTHER PUBLICATIONS

Sygene, UV Epi-illumination versus Transiliumnation, Application Note 05, p. 1 of 1 (Year: 2010).*

*Primary Examiner* — Marnie A Matt
(74) *Attorney, Agent, or Firm* — Jaquelin K. Spong

(57) ABSTRACT

There is provided a microscope device comprising a microscope objective (12), a first light source (18) for transmitted light illumination of the sample (16) with light within a first spectral range and a second light source (20) for transmitted light illumination of the sample with light within a second spectral range different from the first spectral range, a tube lens (22) for forming a sample-image from the light collected by the microscope objective, a first camera detector (32) for detecting light within the first spectral range, a second camera detector (34) for detecting light within the second spectral range, a dichroic beam splitter (24) in the image beam path (26) between the tube lens and the detectors, and an analyzer unit (44), The beam splitter reflects light within the first spectral range onto the first detector and transmits light within the second spectral range onto the second detector, and wherein the analyzer unit is configured
(Continued)

Figure 1:
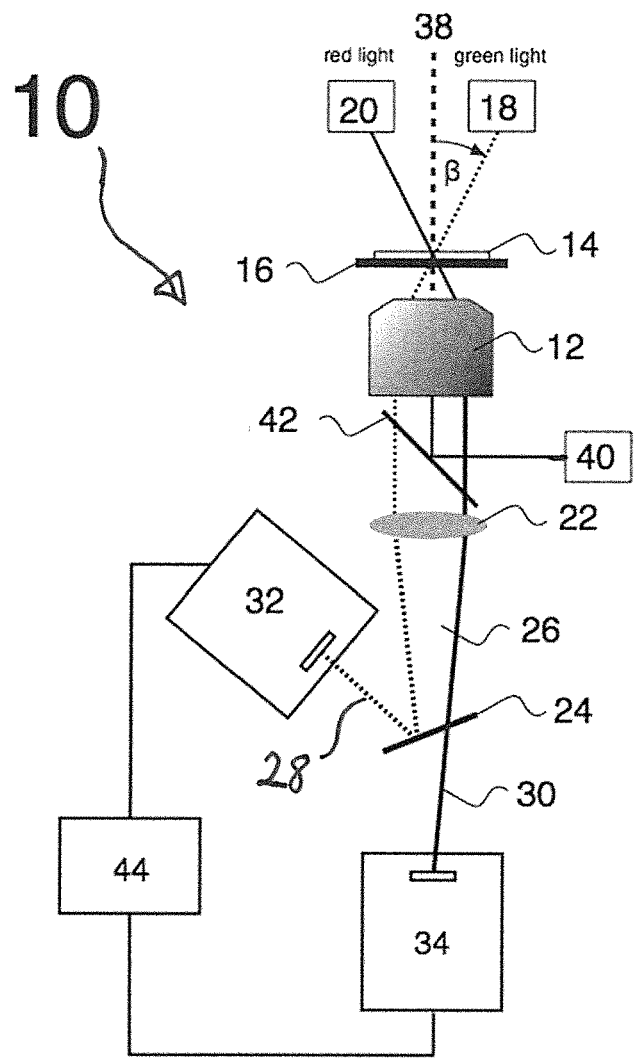

to combine a first image of the sample recorded by the first camera and a second image of the sample recorded by the second camera so as to generate a total sample image with enhanced contrast.

11 Claims, 1 Drawing Sheet

(51) Int. Cl.
    *G02B 21/06*     (2006.01)
    *G02B 21/16*     (2006.01)
    *G02B 21/36*     (2006.01)
    *G02B 27/14*     (2006.01)
    *H04N 5/225*     (2006.01)

(52) U.S. Cl.
    CPC ........... *G02B 21/16* (2013.01); *G02B 21/361* (2013.01); *G02B 27/141* (2013.01); *H04N 5/2258* (2013.01)

(58) Field of Classification Search
    USPC .......................................................... 348/79
    See application file for complete search history.

(56) References Cited

U.S. PATENT DOCUMENTS

| | | | |
|---|---|---|---|
| 2011/0081110 A1* | 4/2011 | Sullivan | G01J 3/0218 385/31 |
| 2013/0215261 A1* | 8/2013 | Rahmani | H04N 7/18 348/93 |
| 2015/0160451 A1* | 6/2015 | Staker | H04N 7/18 348/79 |
| 2018/0210197 A1* | 7/2018 | Dave | G06T 7/38 |
| 2019/0269333 A1* | 9/2019 | Bodenschatz | G02B 21/361 |
| 2020/0264405 A1* | 8/2020 | Putman | G02B 21/02 |
| 2021/0165198 A1* | 6/2021 | Mueller-Rentz | H04N 5/2351 |

* cited by examiner

MICROSCOPE DEVICE WITH ENHANCED CONTRAST FORMED BY LIGHT ILLUMINATION TRANSMITTED IN TWO DIFFERENT SPECTRAL RANGES

The invention relates to a microscope device with two-color detection capabilities.

Typically, camera detectors used in microscopy are monochrome.

U.S. Pat. No. 8,427,646 B2 relates to a microscope device having dual emission capability, wherein detrimental effects of image aberrations and image distortions are reduced by reflecting the first beam of the first spectral range in a manner so as to invert its handedness and reflecting the second beam of the second spectral range in a manner so as to preserve its handedness, thereby obtaining a fully symmetrical configuration, so that corresponding image points in both spectral channels all experience the same field dependent operations. This allows to image the two spectrally different images adjacent to each other onto the same chip of a given detector camera.

It is an object of the invention to provide for a microscope device capable of producing sample images with relatively high contrast.

According to the invention, this object is achieved by a microscope device as defined in claim 1.

The sample is illuminated with transmitted light of two different spectral ranges, which are directed to separate area-detectors. Congruent images on the two detectors are achieved by using a common tube lens for both spectral ranges, with the light of the two spectral ranges being separated by a dichroic beam splitter in the image beam paths between the tube lens and the detectors. The congruent images can be combined to generate a total sample image with enhanced contrast. By using a common tube lens for both beam paths, i.e. by separating the image beam path into two spectral arms in the finite optical space after the last lens system, the optical effects compromising congruence of the two image beam paths are greatly diminished compared to a configuration with separate tube lenses for each spectral arm. Such a configuration with separate tube lenses cannot result in congruent images, since lenses in practice are never exactly identical. Their focal lengths—and hence magnification will always differ, and optical imperfections lead to different distortions of two images.

Using a joint tube lens for both spectral arms reduces optical asymmetry, but cannot fully avoid it. A planar optical element (the dichroic beam splitter), passed at an angle greater 0° (as done by one of the two spectral arms), causes image distortions to that beam which increase with increasing angle and with substrate thickness. In order to separate incoming and reflected beam, the angle $\alpha$ between the incoming beam and the reflected beam should assume a finite value of at least 30° (the angle at which the beam splitter is passed by the incoming beam is half of the angle $\alpha$ between the incoming beam and the reflected beam, i.e. it is $\alpha/2$). Reducing the substrate thickness, on the other hand, also works only to a certain degree, since the reflective coating tends to spoil the planarity of a given substrate, and the effect becomes more pronounced with decreasing substrate thickness. Thus, while reducing the substrate thickness would reduce the detrimental effect on the transmitted beam, it may result in an increased bending the substrate through the reflecting surface layer and hence compromise the reflected beam. A substrate-thickness of 1-2 mm at an angle $\alpha/2$ of the dichroic beam splitter with regard to the incident (common) image beam of 12 to 18° is a good compromise, as illustrated in FIG. 2

Further preferred embodiments are defined in the dependent claims.

Figure 2:
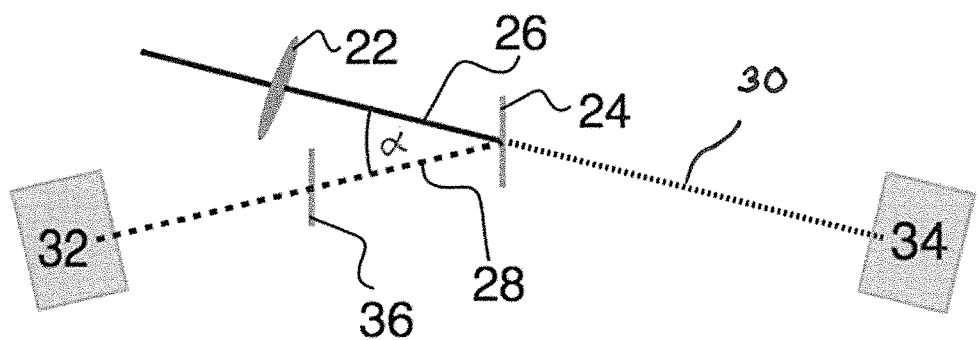

Hereinafter, examples of the invention will be illustrated by reference to the attached drawings, wherein:

FIG. 1 is a schematic illustration of an example of a microscope device according to the invention; and FIG. 2 is a schematic illustration of an example of the use of a dichroic beam splitter for spectral separation of an image beam path including two different spectral ranges on two detectors.

In FIGS. 1 and 2 an example of a microscope device according to the invention is shown schematically. The arrangement 10 shown in FIG. 1 comprises a microscope objective 12, a sample holder (or stage) 14 for holding and moving a sample 16, a first light source 18 for oblique transmitted light illumination of the sample 16 with light within a first spectral range at a first angle with regard to the sample surface and a second light source 20 for oblique transmitted light illumination of the sample 16 with light within a second spectral range different from the first spectral range at a second angle. The light collected by the microscope objective 12 from the sample 16 is converted into an image by a tube lens 22. A dichroic beam splitter 24 is provided in the convergent image beam path 26 so as to reflect light within one of the two spectral ranges (e.g., within the first spectral range), thereby creating a reflected image beam 28, while transmitting light in the other one of the two spectral ranges (e.g., within the second spectral range), thereby creating a transmitted image beam 30. The reflected image beam 28 reaches a first detector camera 32 for recording a first image of the sample based on light within the first spectral range (assuming that the beam splitter 24 reflects light within the first spectral range), while the transmitted image beam paths 30 reaches a second camera detector 34 for recording a second image of the sample 16 based on light within the second spectral range. In the example of FIG. 1 the beam paths of the light within the first spectral range are indicated by dotted lines, while beam paths of the light in the second spectral range are indicated by solid lines.

The beam splitter 24 may be implemented as a long-pass filter (in this case the first spectral range would be at shorter wavelengths than the second spectral range), or it may be implemented as a short-pass (in this case the first spectral range would be at longer wavelengths than the second spectral range).

A blocking filter 36 (shown in FIG. 2 only) may be placed into the reflected image beam 28 between the beam splitter 24 and the first detector 32, so as to block light within the second spectral range (which may be reflected by the beam splitter 24 to some extent although the beam splitter 24 is designed to transmit light within the second spectral range), thereby preventing ghost images on the first detector 32 caused by reflected light within the second spectral range.

In order to minimize the remaining optical asymmetry between the transmitted image beam path 30 and the reflected image beam path 28, the beam splitter 24 should have a relatively low thickness of less than 2 mm, and preferably at least 1 mm, and should be inclined with respect to the common image beam path 26 at as flat an angle as separation of incoming and reflected beam permits. The latter requirement may be fulfilled by selecting the angle of the beam splitter 24 with regard to the incident beam 26 such that the angle α between the common incident beam 26 and the reflected image beam 28 lies between 24 and 36 degrees.

The blocking filter 36 should be inclined at about the same angle, for example, within ±3% with regard to the reflected image beam 28 as is the beam splitter 24 with regard to the common incident beam 26; further, the blocking filter 36 should have the same thickness as the beam splitter 24. Thereby the optical asymmetry between the reflected image beam 28 and the transmitted image beam 30 is further minimized, since in this case the reflected image beam 28 passes through a transmitting optical element (namely the blocking filter 36) which is very similar to the beam splitter 24 through which the transmitted image beam 30 is transmitted, so that the reflected image beam 28 is affected by such transmission in a manner very similar to the manner the transmitted image beam 30 is affected by the transmission through the beam splitter 24, Thereby, the resulting optical distortion is very similar for both the transmitted image beam 30 and the reflected image beam 28, so that the resulting images on the first detector 32 and the second detector 34, respectively, have a very similar point spread function ("PSF"), so that the resulting images will be congruent. In other words, the optical distortion resulting from transmission of the convergent beam through the beam splitter 24 on the one hand and the blocking filter 36 on the other hand will affect both spectral channels in the same manner.

In the example of FIG. 1, the first and second light source 18, 20 are arranged for realizing an oblique transmitted light illumination of the sample 16 from opposite lateral directions, with the first light source 18 providing for oblique illumination from the left side, and the second light source 20 providing for oblique illumination from the right side, with the same inclination angle β with regard to the sample surface. The angle β can be optimized for a given chosen objective by allowing as many diffraction orders as possible to pass the objective. More precisely, the illumination light from the first light source 18 and the illumination light from the second light source 20 are directed onto the sample 16 in such a manner that the light bundles are mirror-symmetric to each other with regard to a plane, which is normal to the sample and which includes the optical axis 38 of the microscope objective 12. Contrast increases with increasing inclination angle β, i.e. the more diffracted and refracted light is collected by the objective.

The first image obtained by the first camera 32, resulting from illumination of the sample 16 by light from the first light source 18, and the second image recorded by the second detector 34, obtained by illumination of the sample 16 with light from the second light source 20, are combined by an analyzer unit 44 in a manner so as to increase the contrast compared to the case of a single oblique transmission illumination (i.e., illumination of the sample 16 only either with the first light source 18 or the second light source 20). One way to combine the first and second image would be to simply add the first and second image. However, a better contrast enhancement can be obtained by dividing the difference between the first image and the second image by the sum of the first image and the second image.

The dual color system illustrated above can also be used in an epi-illumination fluorescence microscope, which includes an epi-illumination light source 40 for illuminating the sample 16 via the microscope objective 12 so as to achieve fluorescence excitation (for example, a beam splitter 42 may be used for directing the epi-illumination light onto the microscope objective 12) wherein the fluorescence emission light from the sample 16 is collected by the microscope objective 12 and is focused by the tube lens 22 for being directed to at least one of the first detector 32 and the second detector 34 by using the dichroic beam splitter 24.

It is to be understood that the light sources 18, 20 and 40 may be integrated within a single light source or may by implements by different spectral ranges obtained from a multiband light source.

Thus, microscope devices like that shown in FIGS. 1 and 2 do not only allow to obtain high contrast images by oblique transmitted light illumination, but also allow to obtain fluorescence images in at least two different spectral ranges without the need for insertion or removal of optical elements in the beam paths, thereby allowing convenient switching between different optical modes. In particular, the enhanced contrast images may be obtained by using high quality fluorescence microscope objectives without negatively affecting the fluorescence beam path. Consequently, the proposed oblique transmitted light illumination with two separate detectors is superior compared to other methods of obtaining contrast transmission images. For example, phase contrast microscopy or differential interference contrast (DIC) microscopy are not well-suited for being used with high quality fluorescence microscopy, since, for example, phase contrast microscopy requires specific objectives, which are not well-suited for fluorescence measurements, and DIC microscopy requires polarizers to be inserted not only in the transmission illumination beam path but also in the image beam path, which polarizers then would have to be removed prior to fluorescence measurement.

It is noted that spectral splitting using two detectors also may be used for simultaneous imaging of two fluorophores or to separate two dyes in a transmitted light image, for example for a specimen dyed simultaneously with hematoxylin and eosin.

The invention claimed is:

1. A microscope device, comprising: a microscope objective (12), a first light source (18) for transmitted light illumination of the sample (16) with light within a first spectral range and a second light source (20) for transmitted light illumination of the sample with light within a second spectral range different from the first spectral range, a tube lens (22) for forming a sample-image from the light collected by the microscope objective, a first camera detector (32) for detecting light within the first spectral range, a second camera detector (34) for detecting light within the second spectral range, a dichroic beam splitter (24) in the image beam path (26) between the tube lens and the detectors, and an analyzer unit (44), wherein the beam splitter reflects light within the first spectral range onto the first detector and transmits light within the second spectral range onto the second detector, and wherein the analyzer unit is configured to combine a first image of the sample recorded by the first camera and a second image of the sample recorded by the second camera so as to generate a total sample image with enhanced contrast, wherein the first and second light sources (18, 20) are for transmitted light illumination of the sample, and wherein the light from the first light source impinges on the sample at a first angle relative to the sample surface, and wherein the light from the second light source impinges on the sample with a second angle range relative to the sample surface.

2. The microscope device of claim 1, further comprising an epi-illumination light source (40) for illuminating the sample via the microscope objective (12) for fluorescence excitation, wherein the fluorescence emission light from the sample is collected by the microscope objective and imaged by the tube lens (22) onto at least one of the first and the second detector (32, 34).

3. The microscope device of claim 1, wherein the angle (a/2) of the dichroic beam splitter (24) with regard to the incident beam (26) lies between 12 and 18°.

4. The microscope device of claim 1, wherein the dichroic beam splitter (24) has a thickness between 1 and 2 mm.

5. The microscope device of claim 1, wherein a blocking filter (36) is provided between the dichroic beamsplitter (24) and the first detector (32) for blocking light within the second spectral range so as to prevent ghost images on the first detector.

6. The microscope device of claim 5, wherein the blocking filter (36) is inclined at an angle with regard to the beam (28) reflected by the dichroic beam splitter (24), which equals—within ±3%—the angle of the dichroic beam splitter with regard to the incident image beam (26) from the tube lens (22) and has—within ±3%—the same thickness as the dichroic beam splitter.

7. The microscope device of claim 1, wherein the analyzer unit (44) is configured to divide the difference between the first and second image by the sum of the first and second image so as to combine the first and second image.

8. The microscope device of claim 1, wherein the first spectral range is at shorter wavelengths than the second spectral range, with the dichroic beam splitter (24) being a long-pass.

9. The microscope device of claim 1, wherein the first spectral range is at longer wavelengths than the second spectral range, with the dichroic beam splitter (24) being a short-pass.

10. The microscope device of claim 1, wherein the first angle and the second angle are equal and wherein the light beams from the first light source (18) and the light beams from the second light source (20) are mirror-symmetric to each other with regard to a plane which is normal to the sample and which includes the optical axis (38) of the microscope objective (12).

11. The microscope device of claim 10, wherein the first angle is from 43° to 47°.

* * * * *